(12) United States Patent
Karunakaran et al.

(10) Patent No.: US 12,218,833 B2
(45) Date of Patent: *Feb. 4, 2025

(54) OPTIMIZED PROCESSING OF MULTICAST DATA MESSAGES IN A HOST

(71) Applicant: VMware LLC, Palo Alto, CA (US)

(72) Inventors: Senthilkumar Karunakaran, Santa Clara, CA (US); Subin Cyriac Mathew, San Jose, CA (US); Chidambareswaran Raman, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,236

(22) Filed: Sep. 9, 2023

(65) Prior Publication Data

US 2023/0421494 A1 Dec. 28, 2023

Related U.S. Application Data

(63) Continuation of application No. 17/532,254, filed on Nov. 22, 2021, now Pat. No. 11,784,926.

(51) Int. Cl.
*H04L 45/58* (2022.01)
*H04L 12/18* (2006.01)
*H04L 45/16* (2022.01)

(52) U.S. Cl.
CPC .............. *H04L 45/58* (2013.01); *H04L 12/18* (2013.01); *H04L 45/16* (2013.01)

(58) Field of Classification Search
None
See application file for complete search history.

(56) References Cited

U.S. PATENT DOCUMENTS

| 5,079,767 | A | 1/1992 | Perlman |
| 5,128,926 | A | 7/1992 | Perlman et al. |
| 6,154,463 | A | 11/2000 | Aggarwal et al. |
| 7,317,722 | B2 | 1/2008 | Aquino et al. |
| 7,802,000 | B1 | 9/2010 | Huang et al. |

(Continued)

FOREIGN PATENT DOCUMENTS

| CN | 101102214 A | 1/2008 |
| CN | 101222346 A | 7/2008 |

(Continued)

OTHER PUBLICATIONS

PCT International Search Report and Written Opinion of Commonly Owned International Patent Application PCT/US2022/049330, mailing date Feb. 27, 2023, 10 pages, International Searching Authority (EPO).

*Primary Examiner* — Hong Shao
(74) *Attorney, Agent, or Firm* — Quarles & Brady LLP

(57) ABSTRACT

Some embodiments provide a method for forwarding multicast data messages at a forwarding element on a host computer. The method receives a multicast data message from a routing element executing on the host computer along with metadata appended to the multicast data message by the routing element. Based on a destination address of the multicast data message, the method identifies a set of recipient ports for a multicast group with which the multicast data message is associated. For each recipient port, the method uses the metadata appended to the multicast data message by the routing element to determine whether to deliver a copy of the multicast data message to the recipient port.

20 Claims, 10 Drawing Sheets

(56) References Cited

U.S. PATENT DOCUMENTS

| | | |
|---|---|---|
| 7,925,778 B1 | 4/2011 | Wijnands et al. |
| 8,111,633 B1 | 2/2012 | Aggarwal et al. |
| 8,537,816 B2 | 9/2013 | Anumala et al. |
| 8,665,887 B2 | 3/2014 | Ge et al. |
| 8,908,686 B1 | 12/2014 | Ghosh |
| 9,043,452 B2 | 5/2015 | Fulton |
| 9,137,045 B2 | 9/2015 | Chen et al. |
| 9,270,585 B2 | 2/2016 | Manion et al. |
| 9,432,204 B2 | 8/2016 | Shen et al. |
| 9,479,348 B2 | 10/2016 | Sreeramoju et al. |
| 9,602,385 B2 | 3/2017 | Tessmer et al. |
| 9,692,655 B2 | 6/2017 | Koponen et al. |
| 9,794,079 B2 | 10/2017 | Tessmer et al. |
| 10,015,643 B2 | 7/2018 | Zuniga et al. |
| 10,198,492 B1 | 2/2019 | O'Neill et al. |
| 10,218,523 B2 | 2/2019 | Boutros et al. |
| 10,263,884 B2 | 4/2019 | Kota et al. |
| 10,454,833 B1 | 10/2019 | Bosshart et al. |
| 10,484,303 B2 | 11/2019 | Shepherd et al. |
| 10,503,565 B2 | 12/2019 | Guo et al. |
| 10,511,548 B2 | 12/2019 | Liu et al. |
| 10,523,455 B2 | 12/2019 | Boutros et al. |
| 10,567,187 B2 | 2/2020 | Mathew et al. |
| 10,873,473 B2 | 12/2020 | Boutros et al. |
| 10,904,134 B2 | 1/2021 | Jiang et al. |
| 10,958,462 B2 | 3/2021 | Boutros et al. |
| 10,979,246 B2 | 4/2021 | Boutros et al. |
| 11,063,872 B2 | 7/2021 | Mathew et al. |
| 11,595,296 B2 | 2/2023 | Selvaraj et al. |
| 2003/0088696 A1 | 5/2003 | McCanne |
| 2003/0152098 A1 | 8/2003 | Zhu |
| 2003/0165140 A1 | 9/2003 | Tang et al. |
| 2004/0258003 A1 | 12/2004 | Kokot et al. |
| 2006/0153219 A1 | 7/2006 | Wong et al. |
| 2007/0104192 A1 | 5/2007 | Yoon et al. |
| 2009/0147786 A1 | 6/2009 | Li et al. |
| 2009/0279701 A1 | 11/2009 | Moisand et al. |
| 2011/0158113 A1 | 6/2011 | Nanda et al. |
| 2011/0211517 A1 | 9/2011 | Moscibroda et al. |
| 2012/0033668 A1 | 2/2012 | Humphries |
| 2013/0044641 A1 | 2/2013 | Koponen et al. |
| 2013/0051399 A1 | 2/2013 | Zhang et al. |
| 2013/0058229 A1 | 3/2013 | Casado et al. |
| 2013/0103817 A1 | 4/2013 | Koponen et al. |
| 2013/0107699 A1 | 5/2013 | Miclea |
| 2013/0107883 A1 | 5/2013 | Ashwood-Smith |
| 2013/0114466 A1 | 5/2013 | Koponen et al. |
| 2013/0117428 A1 | 5/2013 | Koponen et al. |
| 2013/0117429 A1 | 5/2013 | Koponen et al. |
| 2013/0128886 A1 | 5/2013 | Shah |
| 2013/0188521 A1 | 7/2013 | Jain |
| 2013/0287026 A1 | 10/2013 | Davie |
| 2013/0322443 A1 | 12/2013 | Dunbar et al. |
| 2013/0329605 A1 | 12/2013 | Nakil et al. |
| 2014/0003427 A1 | 1/2014 | Nishi et al. |
| 2014/0064142 A1 | 3/2014 | Mylarappa et al. |
| 2014/0098813 A1 | 4/2014 | Mishra et al. |
| 2014/0098815 A1 | 4/2014 | Mishra et al. |
| 2014/0185613 A1 | 7/2014 | Sato |
| 2014/0198661 A1 | 7/2014 | Raman et al. |
| 2014/0223435 A1 | 8/2014 | Chang |
| 2014/0328159 A1 | 11/2014 | Rebella et al. |
| 2015/0009995 A1 | 1/2015 | Gross, IV et al. |
| 2015/0016286 A1 | 1/2015 | Ganichev et al. |
| 2015/0016460 A1 | 1/2015 | Zhang et al. |
| 2015/0016469 A1 | 1/2015 | Ganichev et al. |
| 2015/0055651 A1 | 2/2015 | Shen et al. |
| 2015/0055652 A1 | 2/2015 | Yong et al. |
| 2015/0058968 A1 | 2/2015 | Wang et al. |
| 2015/0063364 A1 | 3/2015 | Thakkar et al. |
| 2015/0103843 A1 | 4/2015 | Chandrashekhar et al. |
| 2015/0139238 A1 | 5/2015 | Pourzandi et al. |
| 2015/0263899 A1 | 9/2015 | Tubaltsev et al. |
| 2015/0281125 A1 | 10/2015 | Koponen et al. |
| 2016/0092257 A1 | 3/2016 | Wang et al. |
| 2016/0092259 A1 | 3/2016 | Mehta et al. |
| 2016/0094365 A1 | 3/2016 | Subramaniyam et al. |
| 2016/0094366 A1 | 3/2016 | Wang et al. |
| 2016/0094396 A1 | 3/2016 | Chandrashekhar et al. |
| 2016/0094398 A1 | 3/2016 | Choudhury et al. |
| 2016/0105333 A1 | 4/2016 | Lenglet et al. |
| 2016/0226671 A1 | 8/2016 | Lemoine |
| 2016/0241410 A1 | 8/2016 | Lemoine |
| 2018/0063193 A1 | 3/2018 | Chandrashekhar et al. |
| 2019/0007342 A1 | 1/2019 | Wang et al. |
| 2019/0020490 A1 | 1/2019 | Boutros et al. |
| 2019/0020491 A1 | 1/2019 | Boutros et al. |
| 2019/0020492 A1 | 1/2019 | Boutros et al. |
| 2019/0028328 A1 | 1/2019 | Tessmer et al. |
| 2019/0158381 A1 | 5/2019 | Beeram et al. |
| 2019/0182061 A1 | 6/2019 | Boutros et al. |
| 2020/0036646 A1 | 1/2020 | Mathew et al. |
| 2020/0067818 A1 | 2/2020 | Jeuk et al. |
| 2020/0067819 A1 | 2/2020 | Basavaraj et al. |
| 2021/0099400 A1 | 4/2021 | Elizabeth et al. |
| 2021/0111914 A1 | 4/2021 | Boutros et al. |
| 2021/0126866 A1 | 4/2021 | Mathew et al. |
| 2021/0218587 A1 | 7/2021 | Mishra et al. |
| 2021/0218684 A1 | 7/2021 | Rekhate et al. |
| 2021/0243253 A1 | 8/2021 | Pang et al. |
| 2021/0314263 A1 | 10/2021 | Mathew et al. |
| 2022/0045875 A1 | 2/2022 | Zhou et al. |
| 2022/0231875 A1 | 7/2022 | Karunakaran et al. |
| 2022/0417132 A1 | 12/2022 | Selvaraj et al. |
| 2022/0417133 A1 | 12/2022 | Selvaraj et al. |
| 2023/0164067 A1 | 5/2023 | Karunakaran et al. |

FOREIGN PATENT DOCUMENTS

| | | |
|---|---|---|
| CN | 103516542 A | 1/2014 |
| CN | 104243323 A | 12/2014 |
| CN | 104426681 A | 3/2015 |
| CN | 104871483 A | 8/2015 |
| CN | 105684363 A | 6/2016 |
| CN | 106165358 A | 11/2016 |
| CN | 106850878 A | 6/2017 |
| EP | 1876766 A1 | 1/2008 |
| GB | 2529705 A | 3/2016 |
| WO | 2015054671 A2 | 4/2015 |
| WO | 2015142404 A1 | 9/2015 |
| WO | 2019018261 A1 | 1/2019 |
| WO | 2023091336 A1 | 5/2023 |

```
          Multicast Data Message

SRC MAC: VM1
DST MAC: Mcast
VNI: LS1
TTL: 10                                400
```

```
      Multicast Data Message (Intra-LR)

SRC MAC: LR1
DST MAC: Mcast
VNI: LS1
TTL: 9

Metadata:
Source LR: LR1
RD: LR4
Flag: Intra-LR
                                       605
```

```
      Multicast Data Message (Inter-LR)

SRC MAC: LR4
DST MAC: Mcast
VNI: LS1
TTL: 8

Metadata:
Source LR: LR1
RD: LR4
Flag: Inter-LR
                                       610
```

*Figure 7*

OPTIMIZED PROCESSING OF MULTICAST DATA MESSAGES IN A HOST

CLAIM OF BENEFIT TO PRIOR APPLICATIONS

This application is a continuation application of U.S. patent application Ser. No. 17/532,254, filed Nov. 22, 2021, now published as U.S. Patent Publication 2023/0164067. U.S. patent application Ser. No. 17/532,254, now published as U.S. Patent Publication 2023/0164067, is incorporated herein by reference.

BACKGROUND

In a typical datacenter, a single host server may run dozens, if not hundreds, of virtual machines. As a result, multicast data messages that are sent to groups of those VMs may be replicated within a single host server many times. Any internal processing required for each of these copies of a multicast data message uses processing resources (e.g., memory, CPU time) of the host server. As such, techniques for replicating multicast messages to all of the required VMs while minimizing the processing required for those messages would be useful.

BRIEF SUMMARY

Some embodiments provide a method for forwarding multicast data messages within a host computer to save processing resources of the host computer. When a forwarding element of the host computer (e.g., software switch) receives a multicast data message from a routing element (i.e., a software router of the host computer), the forwarding element looks up the recipient ports for the data message (i.e., by identifying the multicast group based on a destination address of the data message and identifying the ports associated with the multicast group). The forwarding element uses metadata appended to the multicast data message by the routing element to determine whether to deliver a copy of the multicast data message to each recipient port. The metadata enables the routing element to avoid generating numerous copies of the multicast data message and passing many copies to the switching element, even when different recipients are associated with different logical routers. Instead, the majority of the copies are generated by the switching element in order to deliver these copies to the recipients.

When the switching element initially receives a multicast data message from either a data compute node (DCN) executing on the host computer (e.g., a VM, a container, etc.) or from a tunnel endpoint of the host computer (i.e., sent via a tunnel from another computing device), the multicast data message does not have appended metadata relating to whether the data message is to be delivered to ports on different logical switches. In some embodiments, the multicast data message does include a logical switch identifier at this point. If the multicast data message is received from another host, then this other host would have included the logical switch identifier in the encapsulation used to tunnel the data message. On the other hand, if the multicast data message is received from a DCN executing on the host, then the switching element of some embodiments identifies the logical switch identifier based on the DCN that sent the multicast data message (e.g., based on some combination of the port through which the multicast data message is sent, the source address of the multicast data message, or other information).

For this initial processing, the switching element of some embodiments identifies the recipient ports for the multicast data message and delivers copies of the data message to any ports that are connected to the same logical switch as the source of the data message (because the data message does not need to be routed to be sent to these ports). In addition, if the source of the multicast data message is a DCN on the host computer and the data message needs to be sent to any other host computers (i.e., because recipients of the multicast group are located at these host computers), copies are encapsulated and sent to the other host computers. If the multicast group also includes any recipients connected to other logical switches, then a copy of the data message is sent to the routing element via a port between the switching element and the routing element.

In some embodiments, the logical network is structured such that each logical network endpoint (e.g., DCN) is attached to a logical switch. Multiple logical switches may be connected by logical routers; for a data message to be sent from one logical switch to another requires processing by the routing element implementing the logical router. In addition, some embodiments include multiple types of logical routers. A first type of logical router (referred to as tier-1, or T1) cannot connect to external networks but can provide services to data messages that it routes. A second type of logical router (referred to as tier-0, or T0) provides connections to external networks for the logical network and also can connect logical routers of the first type (which do not connect directly with each other). A logical network might have multiple T1 logical routers to differentiate business areas within a corporate network (with a T0 logical router managed by a network administrator for the corporation), to segregate different groups of logical switches (e.g., different applications) for which different types of services should be prepared, to segregate different tenants (with a datacenter provider managing the T0 logical router), or for other reasons. In this context, a port is considered associated with a T1 logical router if the logical switch to which the port connects is itself connected to the T1 logical router. A group of T1 logical routers are in the same routing domain if these T1 logical routers all connect to the same T0 logical router.

The routing element of some embodiments performs logical routing on the multicast data message. Without the use of metadata, the routing element would generate a copy for each logical router with which any recipient ports for the multicast data message are associated and pass all of these copies back to the switching element. Instead, the routing element only needs to identify the source logical router (i.e., the logical router with which the source of the multicast data message is associated) and whether any recipient ports are associated with any logical routers other than the source logical router.

If the source logical router is the only logical router with any recipient ports, then only a single multicast data message is returned to the switching element (accompanied by metadata) in some embodiments. On the other hand, if there are recipient ports associated with additional logical routers in the routing domain, then two copies of the multicast data message (i.e., the original and one new copy) are returned to the switching element. In either case, all copies of the multicast data message include metadata specifying the source logical router as well as the routing domain. In addition, a flag is set in the metadata. For a first copy, the flag specifies that the data message is for delivery to recipient ports associated with the source logical router. For the second copy, the flag specifies that the data message is for delivery to recipient ports associated with other logical routers in the routing domain. In some embodiments, the metadata is allocated 32 bits of message buffer space (while being processed in the host computer, each copy of the data message exists as an object or similar data structure that can be passed to various modules including the switching element, the routing element, middlebox elements, etc.).

For the first copy, the time to live (TTL) field of the data message is decremented by one (because the data message has only passed through one logical router), whereas for the second copy the TTL field is decremented by two (or by three in other embodiments, depending on whether the T0 logical router is counted as a hop or just the two T1 logical routers). When all the recipient ports are associated with the source logical router, the single returned data message has TTL decremented by one and the first flag set (specifying that the data message is for delivery to recipient ports associated with the source logical router).

As indicated, upon return of the multicast data message, for each copy the switching element retrieves the set of recipient ports and applies the metadata to determine whether to deliver the data message to each port. In some embodiments, each port includes data indicating its associated logical router and routing domain. For a given port, if the metadata flag specifies that the multicast data message is for delivery to ports associated with the source logical router, the switching element only delivers the data message to the port if the port (i) is associated with the source logical router and (ii) is not connected to the originating logical switch (because these ports would have been delivered the multicast data message prior to the data message being sent to the routing element, as described above). If the metadata flag specifies that the multicast data message is for delivery to ports associated with other logical routers in the routing domain, then the switching element only delivers the data message to the port if the port (i) is associated with the routing domain and (ii) is not associated with the source logical router.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 7 conceptually illustrates examples showing header fields and metadata of an original multicast data message as well as intra-LR and inter-LR data messages that are returned to the switching element in some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for forwarding multicast data messages within a host computer to save processing resources of the host computer. When a forwarding element of the host computer (e.g., software switch) receives a multicast data message from a routing element (i.e., a software router of the host computer), the forwarding element looks up the recipient ports for the data message (i.e., by identifying the multicast group based on a destination address of the data message and identifying the ports associated with the multicast group). The forwarding element uses metadata appended to the multicast data message by the routing element to determine whether to deliver a copy of the multicast data message to each recipient port. The metadata enables the routing element to avoid generating numerous copies of the multicast data message and passing many copies to the switching element, even when different recipients are associated with different logical routers. Instead, the majority of the copies are generated by the switching element in order to deliver these copies to the recipients.

Figure 1:
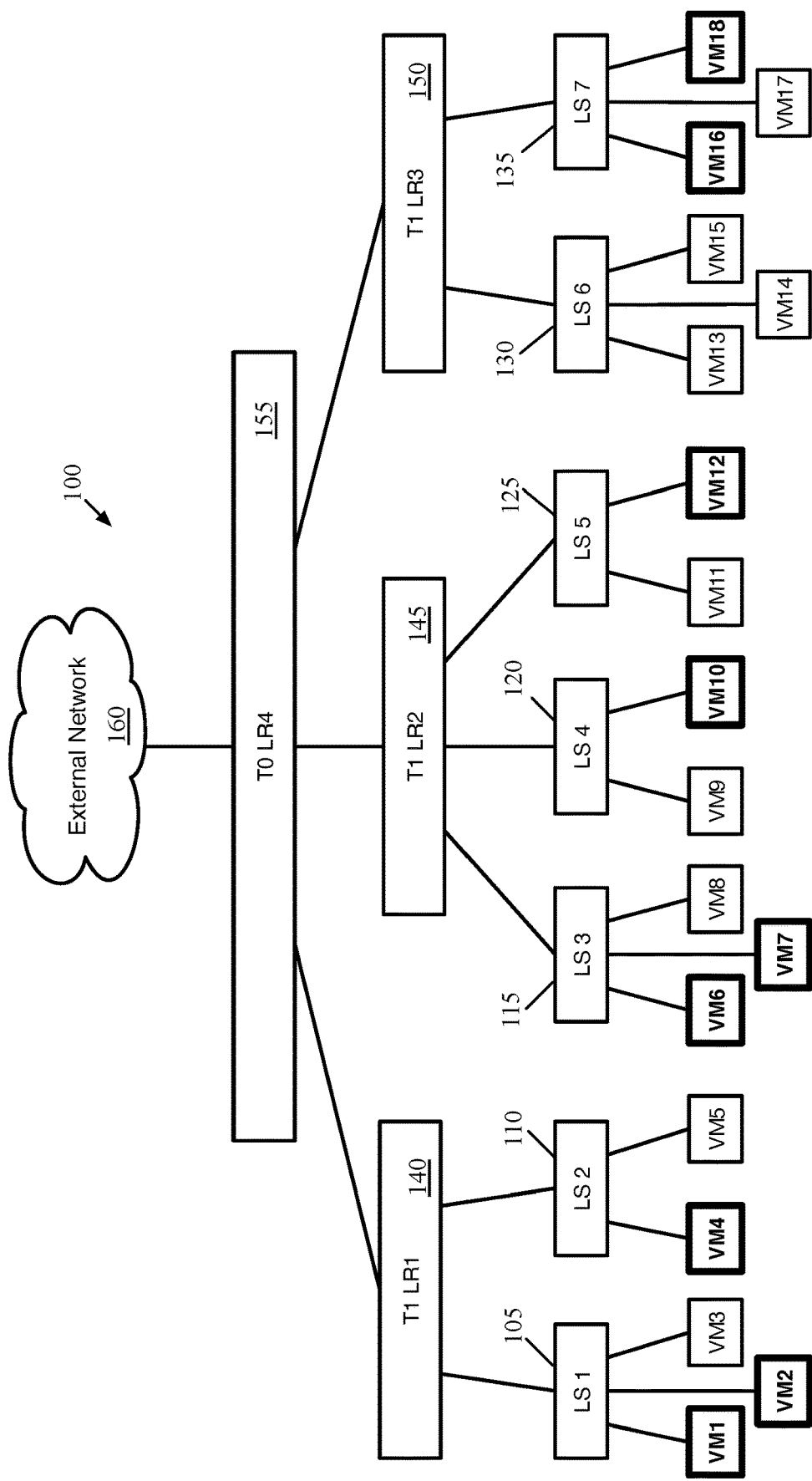
FIG. 1 conceptually illustrates a logical network in which a multicast group is defined.

FIG. 1 conceptually illustrates a logical network 100 in which a multicast group is defined. The logical network 100 includes 18 network endpoint data compute nodes (DCN), which in this case are virtual machines (VMs). In other embodiments, the network endpoints could include containers, bare metal computers, etc., as well as VMs. In some embodiments, the logical network is structured such that each logical network endpoint (e.g., DCNs) is attached to a logical switch. Here, a first logical switch 105 has three connected VMs, a second logical switch 110 has two connected VMs, a third logical switch 115 has three connected VMs, each of fourth and fifth logical switches 120 and 125 has two connected VMs, and each of sixth and seventh logical switches 130 and 135 has three connected VMs. It should be understood that logical network may vary widely in size and structure and that the number of VMs per logical switch, number of logical switches per logical router, etc. will be very different in other logical networks.

Multiple logical switches may be connected by logical routers. In this case, for a data message to be sent from one logical switch to another the data message is processed by the (one or more) logical routers that connect them. In some embodiments, the data message is passed from a virtual switching element (e.g., a software switch) that implements the logical switches to a virtual routing element (e.g., a software router) that implements the logical routers.

Some embodiments include multiple types of logical routers. A first type of logical router (referred to as tier-1, or T1) cannot connect to external networks but can provide services to data messages that it routes. In many cases, logical switches connect directly to these logical routers. In some embodiments, if the T1 logical routers provide stateful services, then the T1 logical routers are logically divided into distributed routers (DRs) and centralized service routers (SRs). The SRs, in some such embodiments, are implemented on edge gateway devices rather than on host computers in a distributed manner. In the logical network 100, the T1 logical routers do not include SRs and only include DRs (i.e., the entire logical router can be implemented on host computers that host the VMs of the logical network 100).

The example logical network 100 includes three T1 logical routers 140-150. The first two logical switches 105 and 110 connect to the first T1 logical router 140, the next three logical switches 115-125 connect to the second T1 logical router 145, and the last two logical switches 130 and 135 connect to the third T1 logical router 150. For a first DCN attached to one logical switch to communicate with a second DCN connected to another logical switch on the same T1 logical router, the first DCN sends a data message that is forwarded according to its own logical switch, the T1 logical router, and the second logical switch, without requiring any other logical router processing. However, one T1 logical router cannot directly connect to another T1 logical router in some embodiments, so additional processing is required for a DCN under one T1 logical router to communicate with a DCN under another T1 logical router.

A second type of logical router (referred to as tier-0, or T0) provides connections to external networks for the logical network and also can connect T1 logical routers. A logical network might have multiple T1 logical routers to differentiate business areas within a corporate network (with a T0 logical router managed by a network administrator for the corporation), to segregate different groups of logical switches (e.g., different applications) for which different types of services should be prepared, to segregate different tenants (with a datacenter provider managing the T0 logical router), or for other reasons. In the logical network 100, a T0 logical router 155 connects the three T1 logical routers 140-150 to each other and to an external network 160.

In addition, the VMs shown in bold (VM1, VM2, VM4, VM6, VM7, VM10, VM12, VM16, and VM18) all belong to a single multicast group. Any data message sent by one of these VMs and addressed to the multicast address associated with the multicast group is replicated and delivered to each of the VMs in the multicast group.

The logical networks of some embodiments are implemented by various forwarding elements that execute on host computers (e.g., that host the logical network endpoint DCNs) and edge devices (e.g., that implement the SRs for the logical routers). The multicast replication suppression of some embodiments relates to operations within host computers, for data messages that do not need to traverse an SR (i.e., multicast data messages that are sent within the domain of a single logical router or within the domain in which T1 logical routers do not include any SRs).

Figure 2:
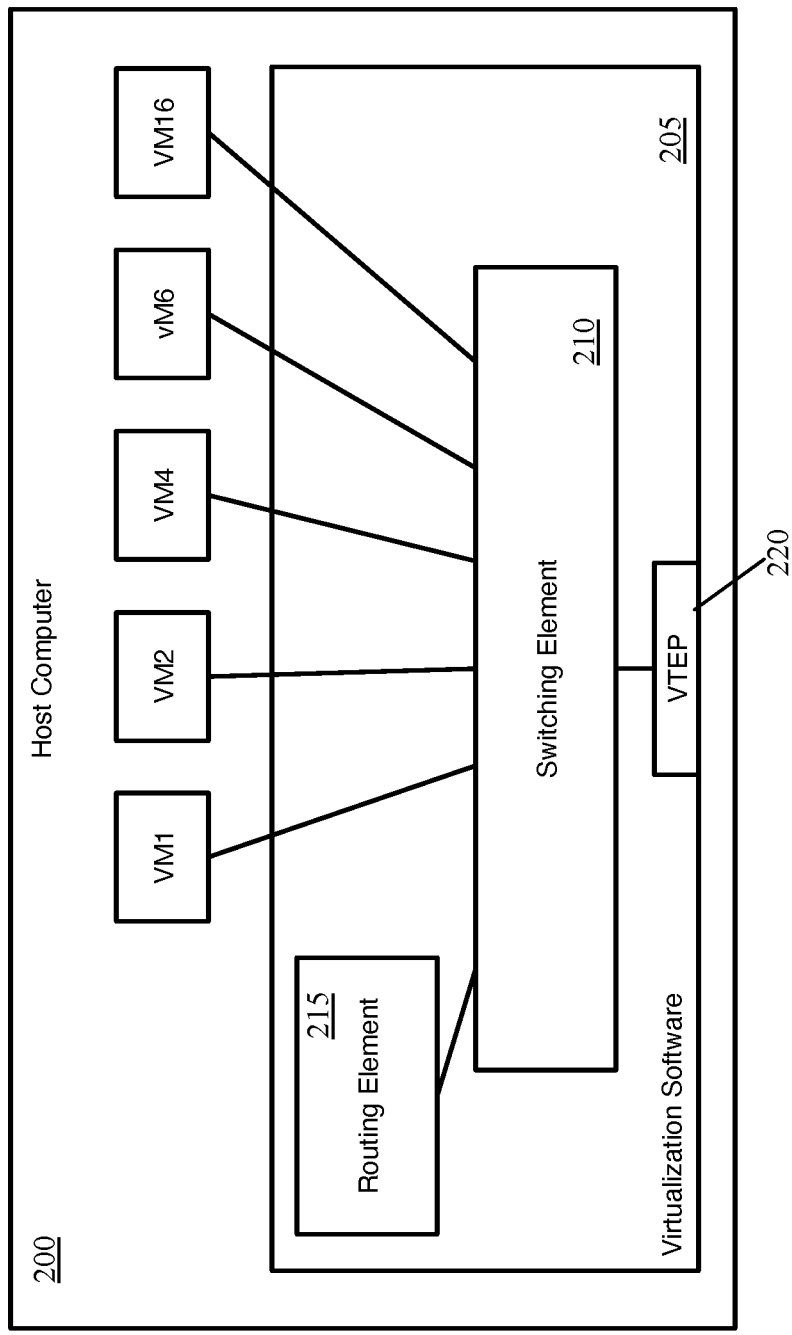
FIG. 2 conceptually illustrates a host computer on which several of the VMs of the logical network shown in FIG. 1 execute.

FIG. 2 conceptually illustrates a host computer 200 on which several of the VMs of the logical network 100 execute. As shown, VM1 and VM2 (connected to logical switch 105), VM4 (connected to logical switch 110), VM6 (connected to logical switch 115), and VM16 (connected to logical switch 135) all execute on the host computer 200. Each of these VMs belongs to the multicast group mentioned above. Other DCNs, either belonging to the logical network but not the multicast group or belonging to different logical networks, may also execute on the host computer 200. In addition, the remaining DCNs of the logical network execute on other host computers (e.g., in the same datacenter or in other datacenters if the logical network is stretched across multiple datacenters).

The host computer 200 executes virtualization software 205 (e.g., a hypervisor, such as VMware ESXi™). This virtualization software 205 enables the execution of the various virtual machines on the host computer 200. In addition, within the virtualization software, the host computer 200 executes a switching element 210 (i.e., a software virtual switch) and a routing element 215 (i.e., a software virtual router). The switching element 210 executes the logical switches of the logical network 100 and passes data messages that require routing (e.g., based on their destination MAC addresses) to the routing element 215 via a router port. In addition, the switching element provides various ports to which the VMs on the host computer connect (e.g., via virtual network interface controllers (vNICs) associated with the VMs). The switching element 210 also includes a port for a virtual tunnel endpoint (VTEP) 220, which (i) encapsulates logical network data messages to send to other host computers and/or edge devices as needed and (ii) decapsulates logical network data messages received from these other host computers and/or edge devices.

The switching element 210, in general, receives data messages from one of its ports and sends them to another port (or multiple other ports, for broadcast and/or multicast data messages) based on their layer 2 (e.g., MAC) addresses. In some embodiments, the switching table stores a set of forwarding tables for performing this forwarding. This set of forwarding tables, in some embodiments, includes recipient port lists for multicast addresses that the switching element uses to identify sets of recipients for multicast data messages. Details of the switching element operations for processing multicast data messages will be described below by reference to FIGS. 3 and 8.

The routing element 215 receives data messages that require routing from the switching element 210, performs logical routing on these data messages, and returns them to the switching element 210. In some embodiments, if a data message does not need to traverse any SRs, the routing element 215 completes all of the necessary logical routing for the data message. For instance, a data message sent from VM1 to VM4 would be processed according to the DR for the first T1 logical router 140, while a data message sent from VM1 to VM6 would be processed according to the DR for the first T1 logical router 140, the DR for the T0 logical router 155, and the DR for the second T1 logical router 145 (assuming there is no SR for either of these T1 logical routers).

The routing element 215 modifies the source and destination MAC addresses of each data message as necessary and decrements the time to live (TTL) field of the data messages for each logical router that processes a given data message. In some embodiments, the routing element 215 is configured with a routing table for each logical router that it uses to process the data messages. For multicast data messages, the routing element 215 uses lookup tables based on the multicast address to determine which logical routers are spanned by the multicast group. As described below, the routing element uses this information to replicate the multicast data messages if necessary and to append metadata to the multicast data messages (and any copies thereof). Some embodiments use this metadata to limit the number of copies made and thereby decrease strain on resources of the host computer. The operations of the routing element of some embodiments for processing multicast data messages are described in greater detail below by reference to FIG. 5.

Figure 3:
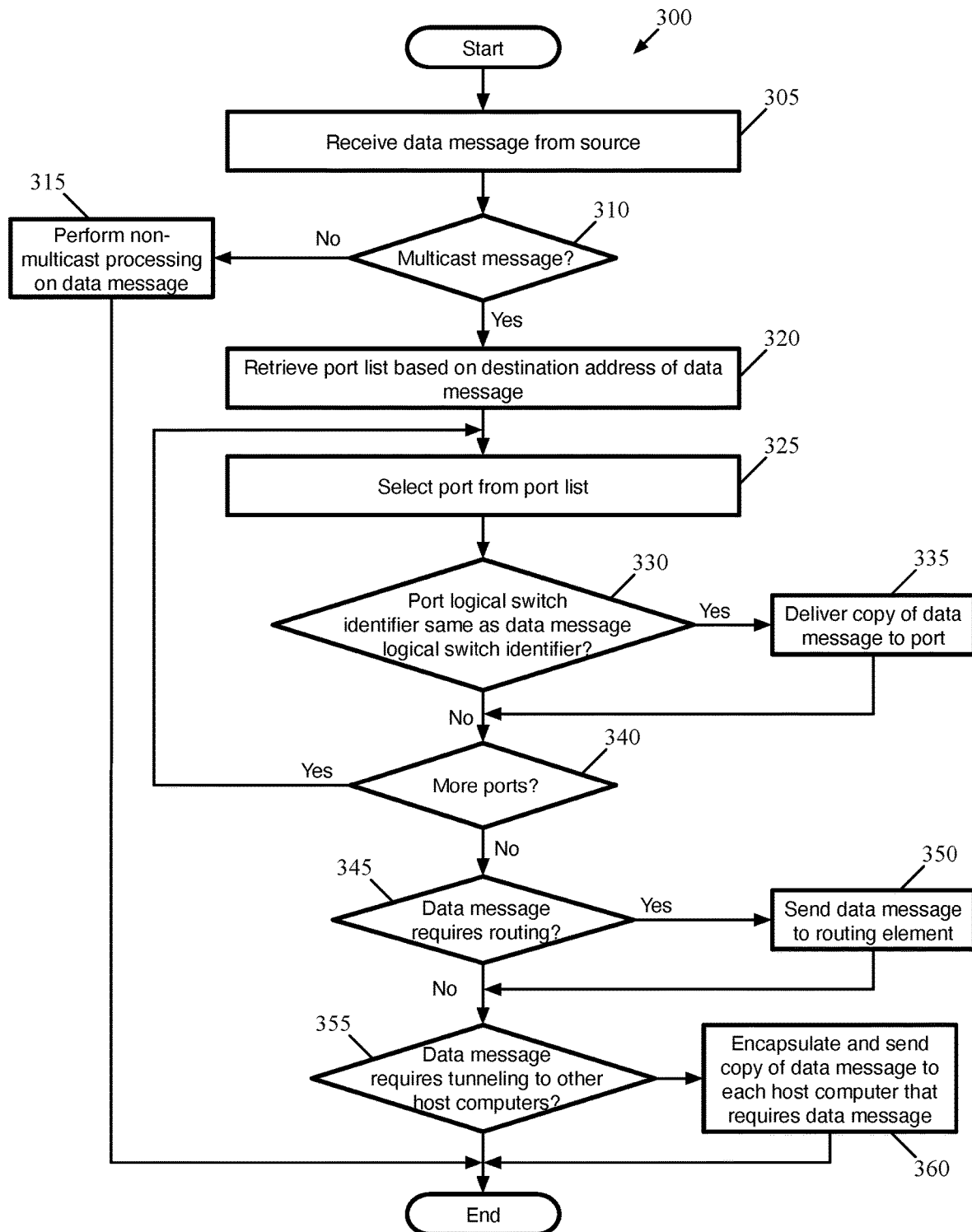
FIG. 3 conceptually illustrates a process of some embodiments for processing a multicast data message at a switching element of a host computer prior to any logical routing of the multicast data message.

FIG. 3 conceptually illustrates a process 300 of some embodiments for processing a multicast data message at a switching element of a host computer prior to any logical routing of the multicast data message. Below, by reference to FIG. 8, the process for processing such a multicast data message after logical routing (using metadata added by the routing element of some embodiments) is described. It should be understood that in some embodiments both of these processes are actually part of the same set of data message processing operations performed by the switching element. The process 300 will be described in part by reference to FIG. 4, which illustrates initial processing of a multicast data message 400 by the switching element 210 from FIG. 2.

Figure 4:
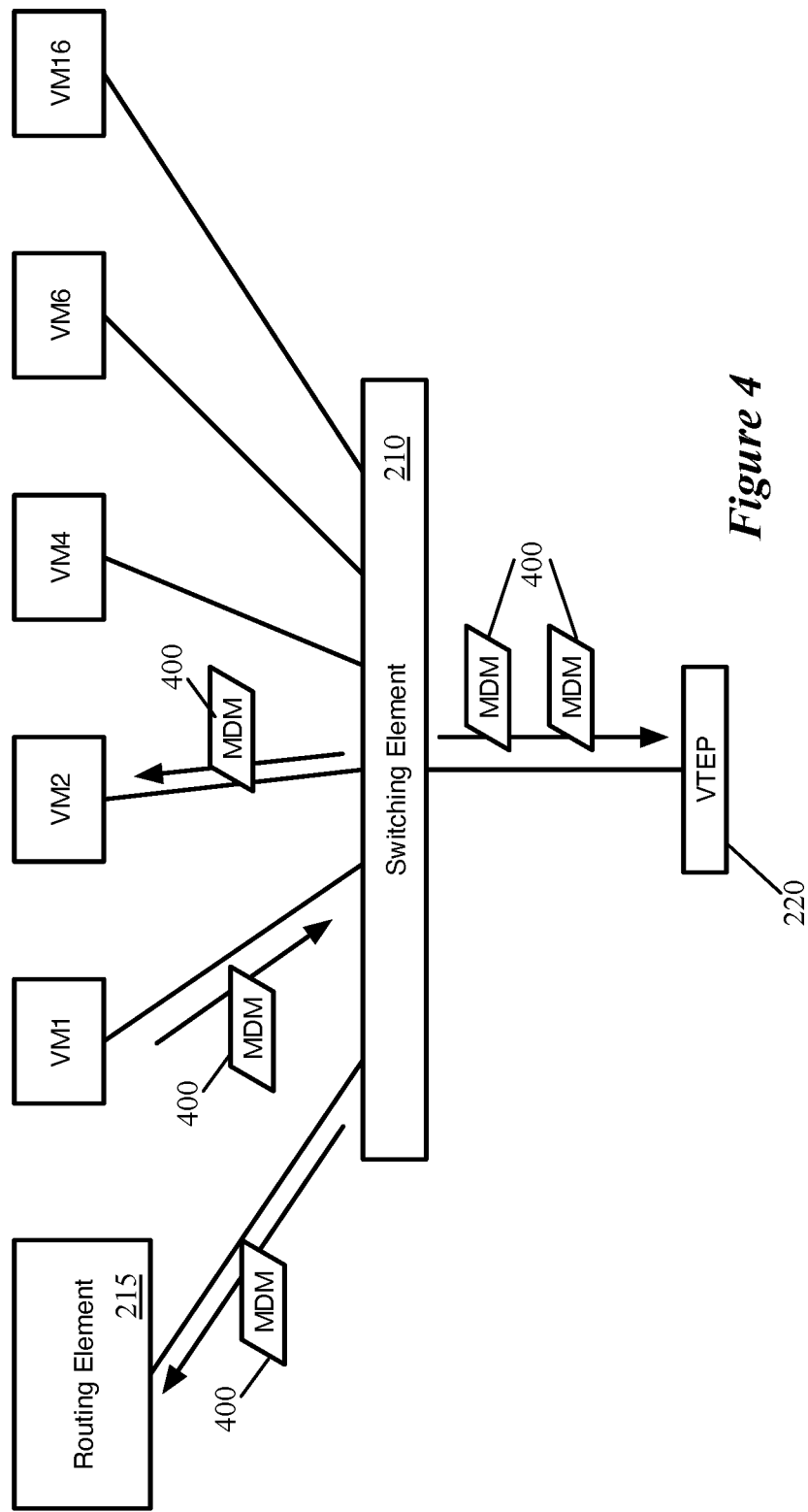
FIG. 4 illustrates initial processing of a multicast data message by the switching element from FIG. 2.

As shown, the process 300 begins by receiving (at 305) a data message from a source of the data message. This source may be a DCN (e.g., a VM) on the host computer or from a VTEP that connects to the switching element. In the former case, the DCN is the initial source of data message, whereas in the latter case the source of the data message would have sent the data message on another host computer that tunneled the data message to the present host computer (often after performing a process similar to the process 300). In the example of FIG. 4, VM1 (which is attached to the first logical router 105) sends a multicast data message 400 via its vNIC (not shown) to a port of the switching element 210.

The process 300 determines (at 310) whether the received data message is a multicast data message. If the data message is not a multicast data message (e.g., it is a unicast data message or a broadcast data message for replication to all endpoints attached to a particular logical switch), the process performs (at 315) non-multicast processing on the data message, then ends. For instance, the switching element might forward the data message to another DCN on the same host computer, send the data message to the VTEP for encapsulation, or send the data message to the routing element for logical routing. It should also be understood that, in some embodiments, the switching element does not make an explicit determination as to whether the data message is multicast or not, but rather performs a lookup based on the destination address of the data message and takes an action based on that lookup.

If the data message is a multicast data message, the process 300 retrieves (at 320) a recipient port list based on the destination address of the data message. The destination MAC address (and IP address, although the switching element uses the MAC address) of the multicast data message will correspond to a multicast group, and the switching element stores a list of its ports that are receivers for the multicast group.

The process 300 selects (at 325) a port from the port list in order to determine whether to deliver a copy of the data message to that port at this time. It should be understood that the process 300 is a conceptual process and that the switching element does not necessarily iterate through one recipient port at a time serially. Instead, some embodiments make determinations regarding some or all of the ports in parallel (and deliver copies of the data message to these ports in parallel).

At this point, because the multicast data message has not been routed, the data message does not yet have any appended metadata relating to whether it is to be delivered to ports on different logical switches. In some embodiments, the multicast data message does include a logical switch identifier at this point. If the multicast data message is received from another host, then this other host would have included the logical switch identifier in the encapsulation used to tunnel the data message. On the other hand, if the multicast data message is received from a DCN executing on the host, then the switching element of some embodiments identifies the logical switch identifier based on the DCN that sent the multicast data message (e.g., based on some combination of the port through which the multicast data message is sent, the source address of the multicast data message, or other information). This logical switch identifier is also referred to as a virtual network identifier (VNI) in some embodiments.

The process 300 determines (at 330) whether the logical switch identifier of the data message is the same as a logical switch identifier associated with the selected port. In some embodiments, the switching element stores information about each of the ports, including the logical switch identifier (as well as the associated logical router and routing domain, as described below). At this point, the multicast data message should only be delivered to ports attached to the same logical switch as the source of the data message, because the data message has not been routed. The routing process is required to modify the data message as described below before delivering the data message to its recipient ports.

If the logical switch identifier for the multicast data message is the same as the logical switch identifier associated with the selected port, the process 300 delivers (at 335) a copy of the data message to the selected port. In some embodiments, the switching element provides the data message to the vNIC attached to the port via any I/O chain modules associated with the port. In the example shown in FIG. 4, a copy of the multicast data message 400 is delivered to VM2 because VM2 is attached to the same logical switch 105 as VM1 (the source VM for the multicast data message 400).

On the other hand, if the logical switch identifier of the data message is different than the logical switch identifier associated with the port, the data message is not delivered to the port at this time (but might be after routing, as described below by reference to FIG. 8). The process 300 then determines (at 340) whether more recipient ports remain. If additional recipient ports remain, the process 300 returns to 325 to select another port from the recipient port list.

In addition to delivering the multicast data message to any recipient ports, the process 300 also determines (at 345) whether the multicast data message requires routing. If so, the process 300 sends (at 350) a copy of the data message to the routing element. As noted, if the multicast group to which the data message is sent includes any recipients located at the host computer and connected to logical switches other than the source logical switch, then a copy of the data message is sent to the routing element via a port between the switching element and the routing element so that the multicast data message can be routed, as described below by reference to FIG. 5. In the example shown in FIG. 4, there are several VMs located on the host computer 200 that are connected to different logical switches, so a copy of the data message 400 is sent to the routing element 215. As described above, there is a processing overhead cost to sending data messages between the switching element and the routing element.

The process 300 also determines (at 355) whether the multicast data message requires tunnelling to any other host computers. If so, the process encapsulates and sends (at 360) a copy of the multicast data message to each host computer that requires the data message, then ends. If the source of the multicast data message is a DCN on the host computer and any recipients of the multicast group are located at other host computers, then the switching element sends one copy per other host computer to the VTEP for the data message copy to be encapsulated and sent to the other host computer. A process similar to the process 300 is then performed on each of these other host computers once the multicast data message is received, in some embodiments. In the example of FIG. 4, the recipient VMs that do not execute on the host computer 200 are located on two other host computers (which are not shown in the figure), and thus two copies of the data message 400 are sent to the VTEP to be encapsulated and transmitted to these other two host computers.

Figure 5:
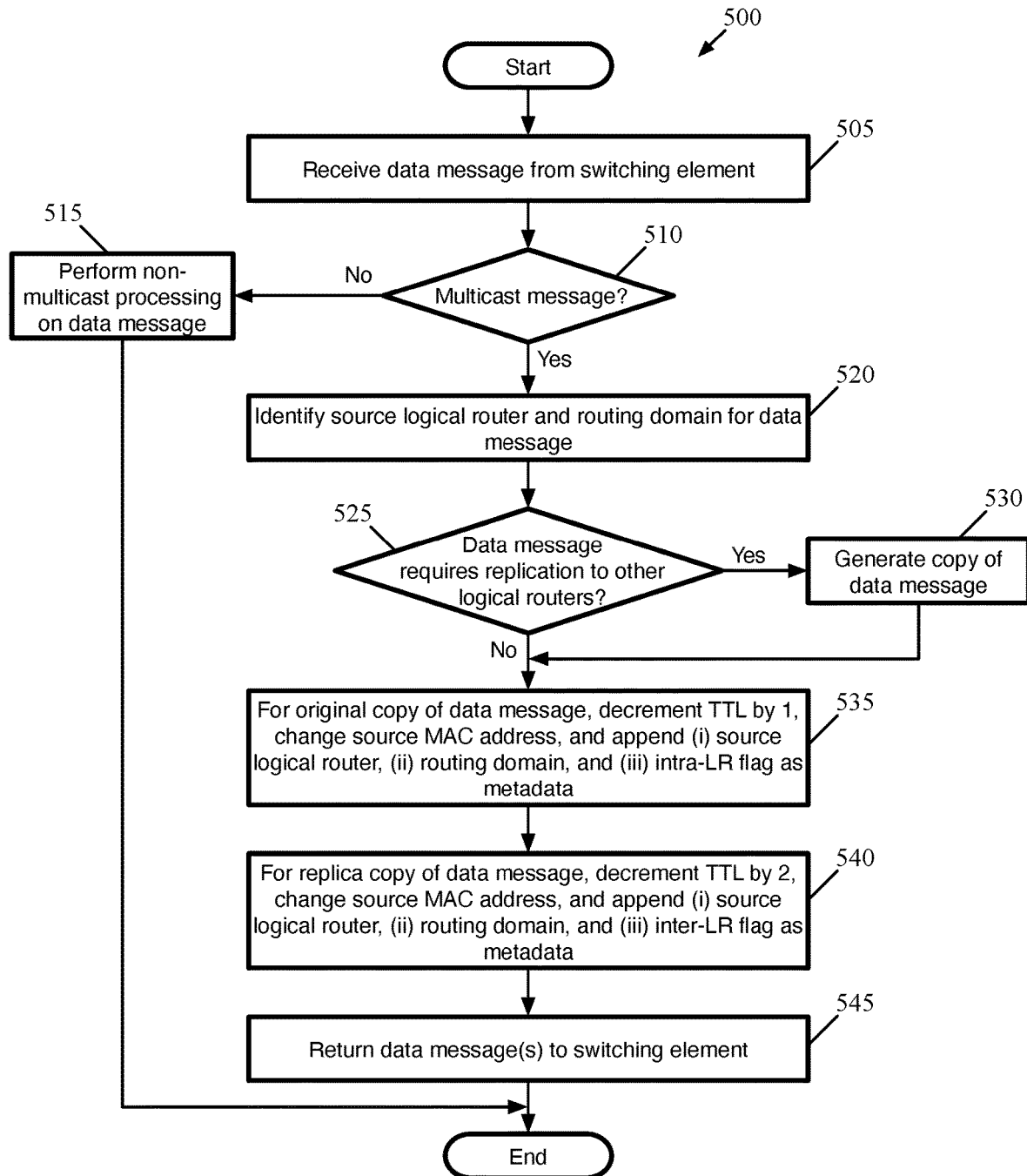
FIG. 5 conceptually illustrates a process of some embodiments for processing a multicast data message at a routing element of a host computer.

FIG. 5 conceptually illustrates a process 500 of some embodiments for processing of a multicast data message at a routing element of a host computer. The routing element typically performs the process 500 after a switching element performs the process 300 and sends the multicast data message to the routing element. The process 500 will be described in part by reference to FIG. 6, which illustrates processing of the multicast data message 400 at the routing element 215 from FIGS. 2 and 4.

As shown, the process 500 begins by receiving (at 505) a data message from the switching element. In some embodiments, the routing element receives the data message via a router port through which the routing element connects to the switching element based on a determination by the switching element that the packet requires logical routing. The source of the data message may be a DCN on the host computer or a network endpoint located elsewhere. In some embodiments, first-hop processing requirements typically mean that unicast data messages have logical routing applied at the host computer on which the source of the data message is located. For multicast data messages, however, routing may be performed at multiple host computers to avoid large amounts of resource-consuming replication.

The process 500 determines (at 510) whether the received data message is a multicast data message. If the data message is not a multicast data message (e.g., it is a unicast data message), the process performs (at 515) non-multicast processing on the data message, then ends. For instance, the routing element will apply the routing tables for any necessary logical routers to a unicast data message, modify the source and destination MAC addresses as necessary, decrement the TTL field, and return the data message to the switching element for further processing. It should also be understood that, in some embodiments, the switching element does not make an explicit determination as to whether the data message is multicast or not, but rather performs a lookup based on the destination address of the data message and takes an action based on that lookup.

If the data message is a multicast data message, the process 500 identifies (at 520) the source logical router and the routing domain for the data message. The source logical router is the logical router with which the source of the multicast data message is associated. In this context, a port (or DCN to which the port corresponds) is considered associated with a logical router if the logical switch to which the port connects is itself connected to the logical router. This is often a T1 logical router, although logical switches can also connect directly to T0 logical routers in some embodiments. Thus, for example, in FIG. 1, VM1 (the source of the example multicast data message 400) is associated with the first T1 logical router 140, as are VM2-VM5. VM6-VM12 are associated with the second T1 logical router 145, while VM13-VM18 are associated with the third T1 logical router 150. In addition, a group of T1 logical routers are in the same routing domain if these T1 logical routers all connect to the same T0 logical router. Some embodiments use the T0 logical router to identify the routing domain. In the example, all of the T1 logical routers 140-150 are in the same routing domain, defined by the T0 logical router 155.

The process 500 then determines (at 525) whether the multicast data message requires replication to other logical routers. If any of the recipient ports on the host computer are associated with logical routers other than the source logical router (but in the same routing domain as the source logical router), then the multicast data message requires replication to these logical routers. Without the use of additional metadata, the routing element would generate a copy of the multicast data message for each logical router with which any recipient ports for the multicast data message are associated and pass all of these copies back to the switching element. In some cases, this could result in any large number of copies of the data message being passed between the routing element and the switching element and thereby overutilizing host computer resources.

Figure 6:
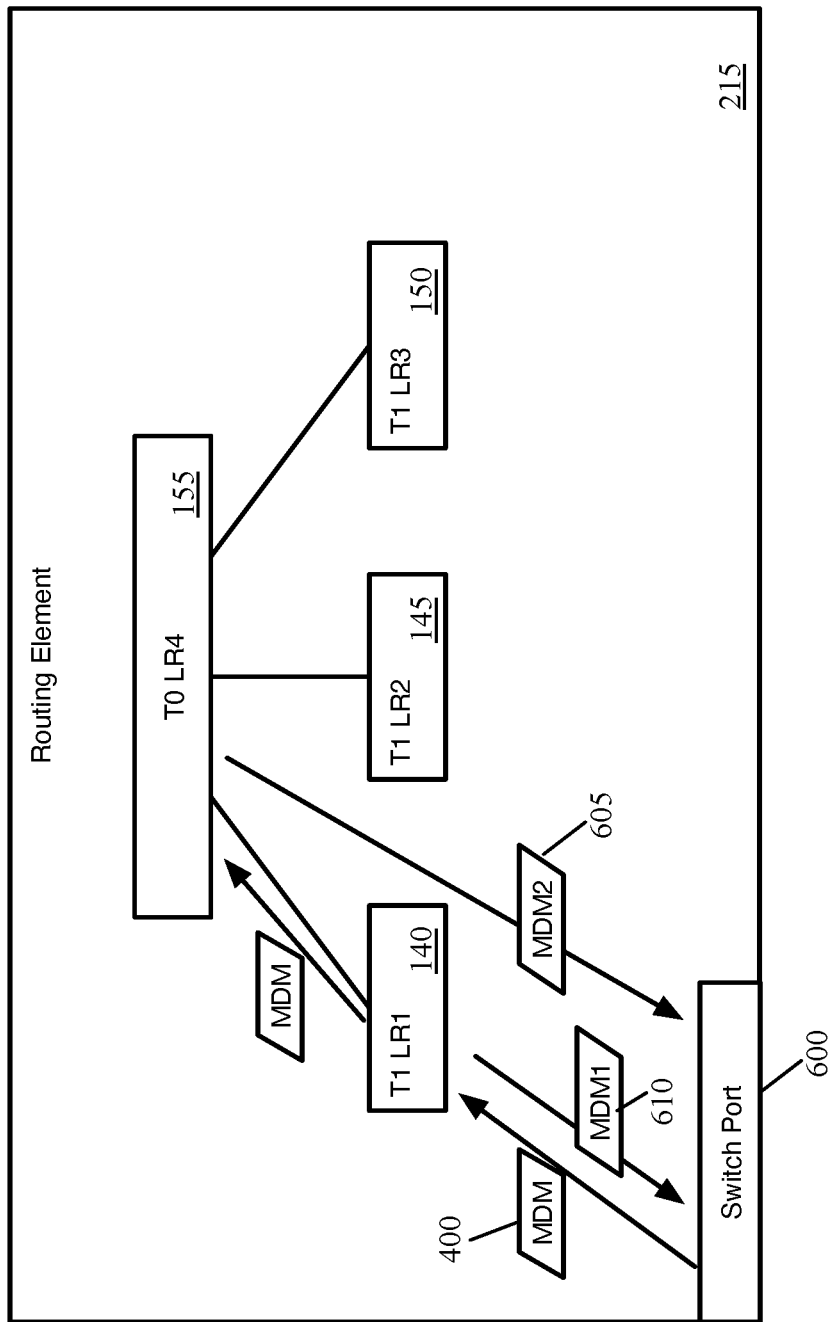
FIG. 6 illustrates processing of the multicast data message from FIG. 2 at the routing element from FIG. 2.

Instead, however, if the data message requires replication to other logical routers, the process generates (at 530) one additional copy of the data message irrespective of the number of additional logical routers with which the recipient ports for the multicast group are located. Thus, the routing element now processes two total copies of the multicast data message, in terms of data message buffer allocation. That is, the buffer in host computer memory stores two copies of the multicast data message which can be separately modified and passed back to the switching element. FIG. 6 illustrates that the multicast data message 400 is received by the routing element 215 at the port 600 between the routing element 215 and the switching element. The routing element 215 processes the multicast data message through the set of logical routers and generates two copies 605 and 610. One of these copies 605 (i.e., the original data message) is modified according to the configuration for the source T1 logical router 140, while the other copy 610 is modified according to the configuration for the T0 logical router 155.

For the original copy of the data message (irrespective of whether a replica copy was generated), the process 500 decrements the TTL field by 1, changes the source MAC address of the data message, and appends (at 535) metadata specifying (i) the source logical router, (ii) the routing domain, and (iii) an intra-LR flag. For the replica copy of the multicast data message (if generated for other logical routers), the process 500 decrements the TTL field by 2 (or by 3 in other embodiments), changes the source MAC address of the data message, and appends (at 540) metadata specifying (i) the source logical router, (ii) the routing domain, and (iii) an inter-LR flag. The process 500 returns (at 545) both of these data messages (or only the first intra-LR data message, if no replication for other logical routers is needed) to the switching element, then ends.

That is, for both copies, the metadata specifies the source logical router and the routing domain. In some embodiments, the total memory allocation for the metadata is 32 bits per data message copy, and each of the router identifiers are 15-bit values. As mentioned, each of these copies of the data message occupies space in the data message buffer. In some embodiments, each data message exists as an object or similar data structure that can be passed to various modules (e.g., the switching and routing elements, any middlebox elements, etc.). The metadata fields can be thought of as fields associated with their respective data message object. The metadata also includes a flag (e.g., a single bit) indicating whether the data message is an intra-LR or inter-LR data message. In some embodiments, the remaining bit in the 32-bit allocation is unused.

As mentioned, header fields of the data message are also modified in some embodiments. While the destination MAC address is not modified (because this is the multicast group address), the routing element modifies the source MAC address of both data messages. For the intra-LR data message, the new source MAC is an address associated with the source logical router. For the inter-LR data message, some embodiments use an address associated with the T0 logical router as the new source MAC address. In some embodiments, the logical routers are configured such that each logical router downlink interface is assigned the same MAC address such that (i) the source MAC address is the same for the intra-LR and inter-LR data messages and (ii) this source MAC address for the inter-LR data message will match up with the downlink interface of the associated T1 logical router for all of the ports to which the data message is delivered.

In addition, the TTL is decremented based on the number of logical routers that process the data message (i.e., the number of "hops"). Thus, the TTL field of the intra-LR data message is decremented by 1. The TTL field of the inter-LR data message is decremented by 2 (for the source logical router and T0 logical router), although other embodiments decrement the TTL field of the inter-LR data message by 3 (counting the source T1 logical router, T0 logical router, and additional T1 logical router.

FIG. 7 conceptually illustrates examples showing header fields and metadata of the original multicast data message 400 as well as the intra-LR and inter-LR data messages 605 and 610 that are returned to the switching element in some embodiments. As shown, the original multicast data message 400 includes a source MAC corresponding to VM1 (its original source), a multicast destination address, a VNI value for the first logical switch 105, and a TTL value of 10.

The intra-LR multicast data message 605 is modified to include a source MAC address associated with a port (i.e., a downlink port that connects to logical switches) of the first T1 logical router 140 and to decrement the TTL value to 9. In addition, the metadata specifies the source logical router (LR1), the routing domain (LR4), and that the data message is for delivery to recipient ports associated with the source logical router (intra-LR).

The inter-LR multicast data message 610 is also modified to include a source MAC address associated with a port (i.e., a downlink port that connects to the logical routers) of the T0 logical router 155 (which, as noted, is the same as the MAC address associated with all of the T1 downlink ports) and to decrement the TTL value to 8. In addition, the metadata specifies the source logical router (LR1), the routing domain (LR4), and that the data message is for delivery to recipient ports associated with other logical routers in the routing domain.

Figure 8:
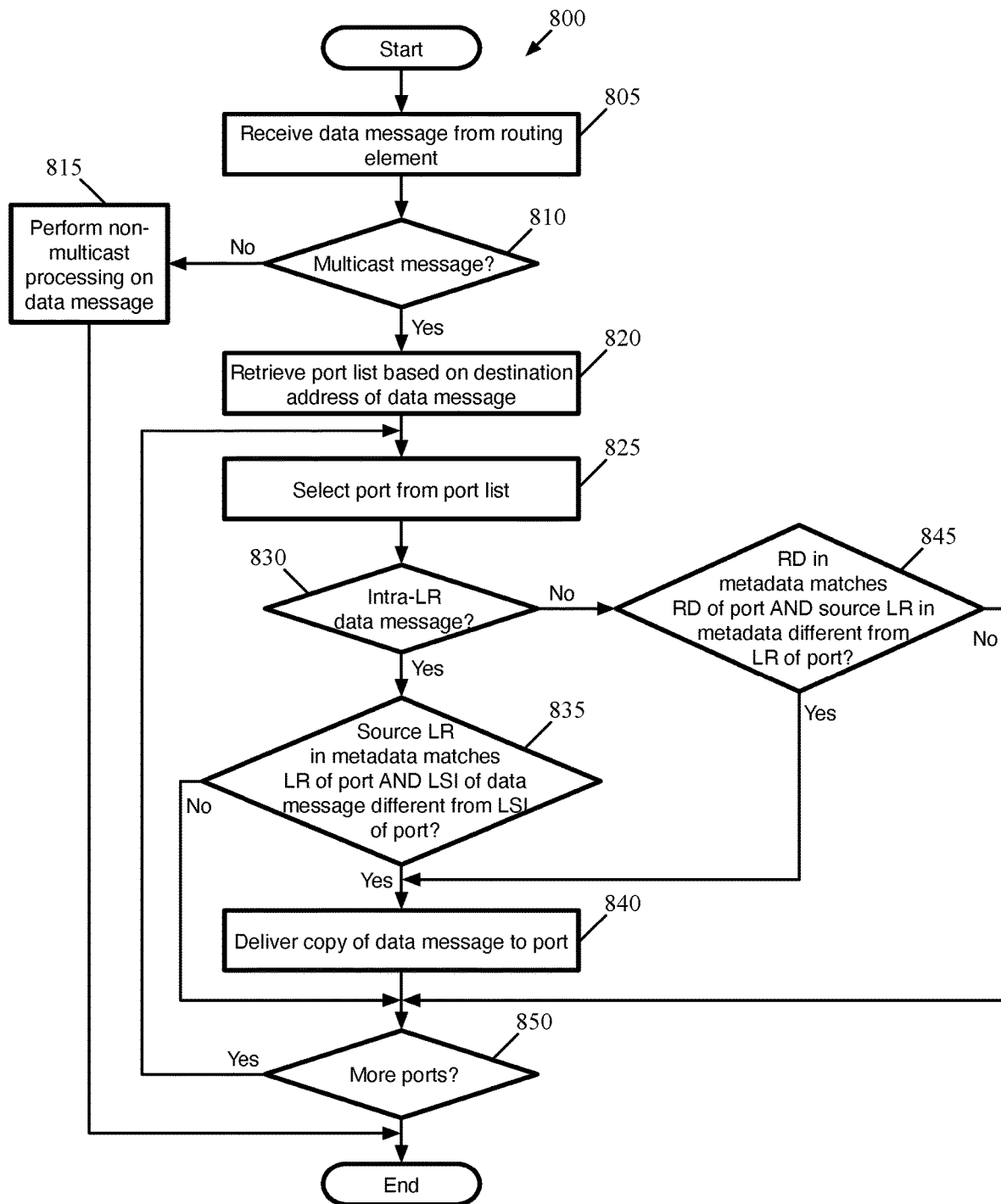
FIG. 8 conceptually illustrates a process of some embodiments for processing a multicast data message at a switching element of a host computer after logical routing of the data message.

FIG. 8 conceptually illustrates a process 800 of some embodiments for processing a multicast data message at a switching element of a host computer after logical routing of the data message. As noted above, it should be understood that in some embodiments the process 300 and the process 800 are actually part of the same set of data message processing operations performed by the switching element. The process 800 will be described in part by reference to FIG. 9, which illustrates processing of the multicast data message 400 by the switching element 210 from FIG. 2 after the data message is returned by the routing element 215.

Figure 9:
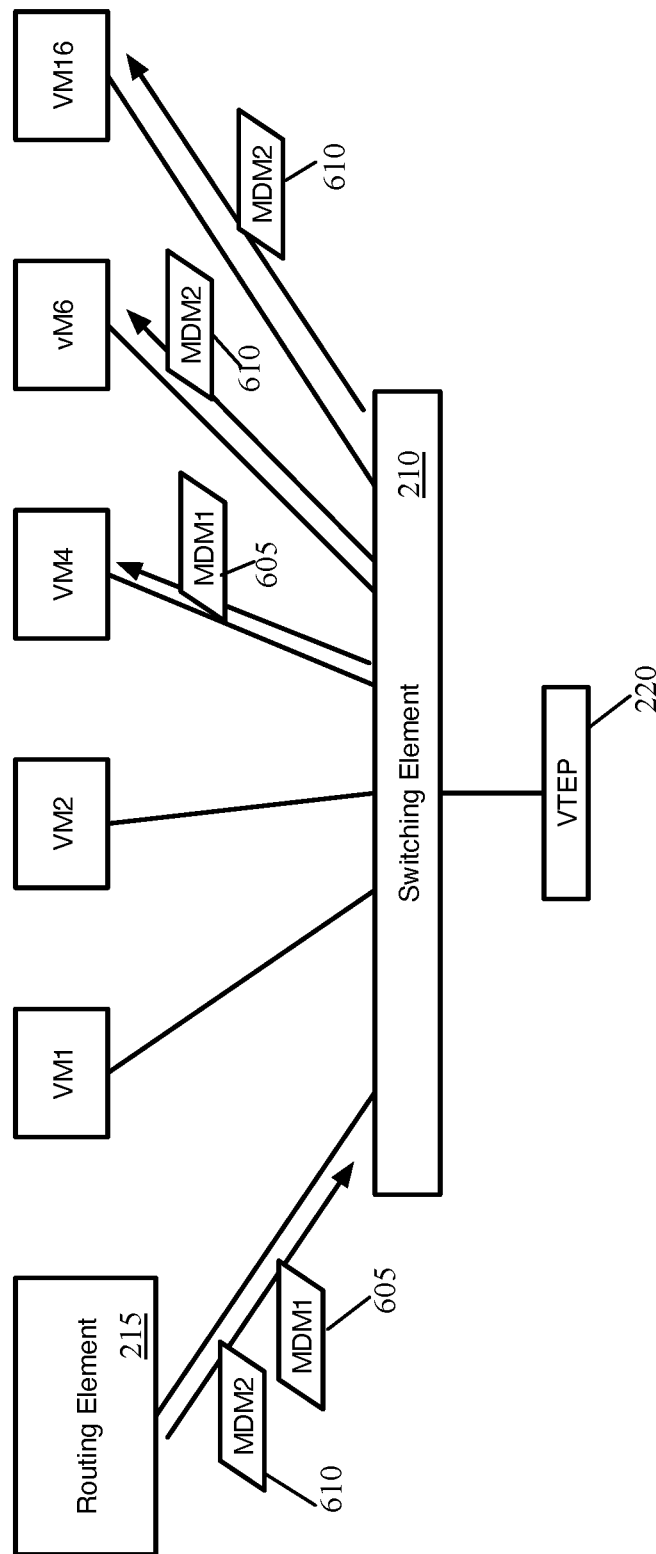
FIG. 9, which illustrates processing of the multicast data message from FIG. 4 by the switching element from FIG. 2 after the data message is returned by the routing element.

As shown, the process 800 begins by receiving (at 805) a data message from a routing element that connects to the switching element. After performing logical routing on a data message, the routing element typically returns the data message to the switching element through the switch port to which the routing element connects. In the example of FIG. 9, the routing element 215 sends to the switching element 210 both the intra-LR data message 605 and the inter-LR data message 610 (along with their respective metadata). These data messages are described above.

The process 800 determines (at 810) whether the received data message is a multicast data message. If the data message is not a multicast data message (e.g., it is a unicast data message), the process performs (at 815) non-multicast processing on the data message, then ends. After logical routing, the switching element might forward the data message to another DCN on the same host computer or send the data message to the VTEP for encapsulation. It should also be understood that, in some embodiments, the switching element does not make an explicit determination as to whether the data message is multicast or not, but rather performs a lookup based on the destination address of the data message and takes an action based on that lookup.

If the data message is a multicast data message, the process 800 retrieves (at 820) a recipient port list based on the destination address of the data message. The destination MAC address (and IP address, although the switching element uses the MAC address) of the multicast data message will correspond to a multicast group, and the switching element stores a list of its ports that are receivers for the multicast group.

The process 800 selects (at 825) a port from the port list in order to determine whether to deliver a copy of the data message to that port at this time. It should be understood that the process 800 is a conceptual process and that the switching element does not necessarily iterate through one recipient port at a time serially. Instead, some embodiments make determinations regarding some or all of the ports in parallel (and deliver copies of the data message to these ports in parallel).

Because the data message is a multicast data message returned from the routing element, metadata indicating the source logical router, routing domain, and whether the multicast data message is an intra-LR or inter-LR data message are appended to the data message. For each port, different tests are applied to the data message depending on whether the data message is an intra-LR or inter-LR data message. Thus, the process 800 determines (at 830) whether the data message is an intra-LR data message (or, by process of elimination, an inter-LR data message). In some embodiments, this is done by determining whether the flag in the metadata for the data message is set to 0 or 1.

If the data message is an intra-LR data message, the process 800 determines (at 835) whether (i) the source logical router field in the metadata of the data message matches the logical router associated with the selected port and (ii) the logical switch identifier of the data message is different from the logical switch identifier associated with the port. In some embodiments, only if both of these conditions are met does the process deliver (at 840) a copy of the intra-LR data message to the selected port. The switching element stores (or looks up) information for each port that indicates the associated logical router, routing domain, and logical switch identifier for each port. The intra-LR data message is delivered to ports associated with the source logical router, but not to ports associated with the logical switch identifier of the data message. These latter ports would have been delivered a copy of the data message during the process 300 (prior to logical routing) and should not receive duplicate copies. In FIG. 9, the intra-LR data message 605 is delivered to VM4 because VM4 is connected to logical switch 110 and therefore associated with the source logical router 140 (but not delivered to VM2 because VM2 is connected to the same logical switch 105 as the source of the data message 400).

If the data message is an inter-LR data message, the process 800 determines (at 845) whether (i) the routing domain field in the metadata of the data message matches the routing domain associated with the selected port and (ii) the source logical router field in the metadata of the data message does not match the logical router associated with the selected port. In some embodiments, only if both of these conditions are met does the process deliver (at 840) a copy of the inter-LR data message to the selected port. The inter-LR data message is delivered to ports associated with the routing domain, but not to ports associated with the source logical router. These latter ports are delivered a copy of either the intra-LR data message or the original data message during process 300 and should not receive duplicate copies. In FIG. 9, the inter-LR data message 610 is delivered to VM6 and VM16 because these VMs are associated with logical routers 145 and 150 respectively. The inter-LR data message 610 is not delivered to VM2 or VM4 because these VMs are associated with the source logical router 140.

The process 800 then determines (at 850) whether more recipient ports remain. If additional recipient ports remain, the process 800 returns to 825 to select another port from the recipient port list. Once all of the ports have been evaluated, the process 800 ends, as the multicast data message processing is complete.

Figure 10:
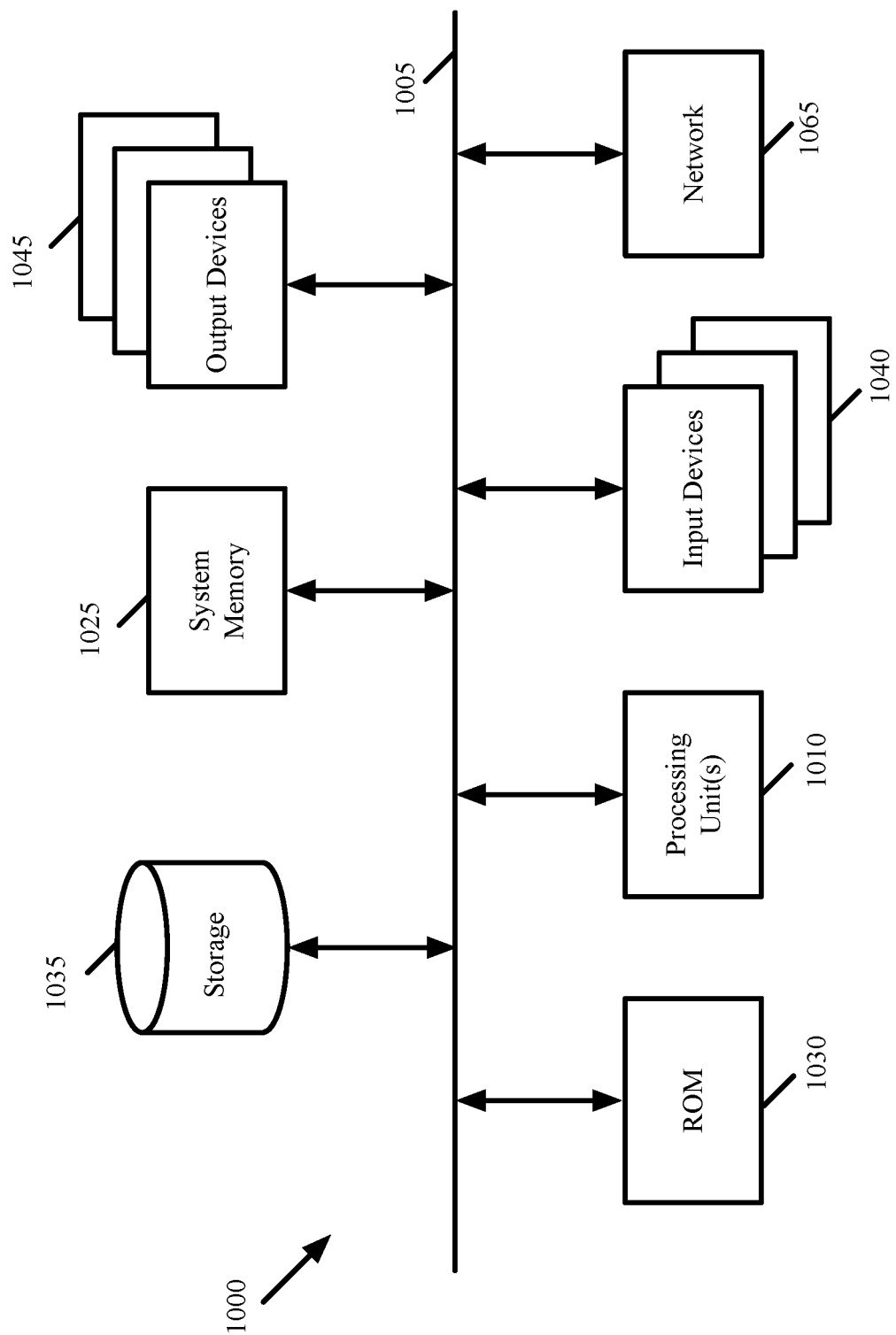
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random-access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3, 5, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for forwarding multicast data messages, the method comprising:

at a forwarding element on a host computer:
receiving a multicast data message from a routing element executing on the host computer along with metadata appended to the multicast data message by the routing element, wherein (i) a source of the multicast data message is attached to a particular logical switch and (ii) the metadata specifies information regarding a set of one or more logical routers in a same logical network as the particular logical switch;

based on a destination address of the multicast data message, identifying a set of recipient ports for a multicast group with which the multicast data message is associated; and for each recipient port, using the metadata appended to the multicast data message by the routing element that specifies information regarding the set of one or more logical routers to determine whether to deliver a copy of the multicast data message to the recipient port.

2. The method of claim 1, wherein the set of one or more logical routers comprises:

at least two logical routers of a first type that do not connect directly to each other, wherein the particular logical switch connects to a particular one of the logical routers of the first type; and a top-level logical router of a second type that enables connection to external networks and connections between first-type logical routers.

3. The method of claim 2, wherein:

the multicast data message is a first data message and the metadata is a first set of metadata; and when the first multicast data message includes recipient ports associated with first-type logical routers other than the particular logical router, the routing element sends to the forwarding element (i) the first multicast data message with the first set of metadata and (ii) a second multicast data message, that is a copy of the first multicast data message, with a second set of metadata.

4. The method of claim 3, wherein time to live (TTL) fields of the first and second multicast data messages are different.

5. The method of claim 2, wherein the metadata includes an identifier for the particular logical router of the first type and an identifier for the top-level logical router.

6. The method of claim 1, wherein:

the forwarding element is a software switch executing on the host computer and the routing element is a software router executing on the host computer, the software router connected to a port of the software switch;

passing data messages between the software router and the software switch uses host computer resources; and use of the metadata reduces a number of copies of multicast data messages made by the software router in order to reduce number of copies of multicast data messages passed between the software router and the software switch.

7. The method of claim 1 further comprising, prior to receiving the multicast data message from the routing element:

receiving the multicast data message from one of (i) a data compute node connected to the forwarding element and (ii) a tunnel endpoint of the host computer;

based on the destination address of the multicast data message, identifying the set of recipient ports for the multicast group; and delivering copies of the multicast data message to recipient ports connected to the particular logical switch.

8. The method of claim 7 further comprising, prior to receiving the multicast data message from the routing element, sending the multicast data message to the routing element, wherein a port between the forwarding element and the routing element belongs to the identified set of recipient ports.

9. The method of claim 7, wherein delivering copies of the multicast data message to recipient ports connected to the particular logical switch comprises comparing a logical switch identifier appended to the multicast data message to logical switch identifiers associated with each port in the set of recipient ports.

10. The method of claim 7 further comprising encapsulating a copy of the multicast data message and sending the encapsulated copy to a different host computer based on the identification of the set of recipient ports prior to receiving the multicast data message from the routing element.

11. A non-transitory machine-readable medium storing a forwarding element which when executed by at least one processing unit of a host computer forwards multicast data messages, the forwarding element comprising sets of instructions for:

receiving a multicast data message from a routing element executing on the host computer along with metadata appended to the multicast data message by the routing element, wherein (i) a source of the multicast data message is attached to a particular logical switch and (ii) the metadata specifies information regarding a set of one or more logical routers in a same logical network as the particular logical switch;

based on a destination address of the multicast data message, identifying a set of recipient ports for a multicast group with which the multicast data message is associated; and for each recipient port, using the metadata appended to the multicast data message by the routing element that specifies information regarding the set of one or more logical routers to determine whether to deliver a copy of the multicast data message to the recipient port.

12. The non-transitory machine-readable medium of claim 11, wherein the set of one or more logical routers comprises:

at least two logical routers of a first type that do not connect directly to each other, wherein the particular logical switch connects to a particular one of the logical routers of the first type; and a top-level logical router of a second type that enables connection to external networks and connections between first-type logical routers.

13. The non-transitory machine-readable medium of claim 12, wherein:

the multicast data message is a first data message and the metadata is a first set of metadata; and when the first multicast data message includes recipient ports associated with first-type logical routers other than the particular logical router, the routing element sends to the forwarding element (i) the first multicast data message with the first set of metadata and (ii) a second multicast data message, that is a copy of the first multicast data message, with a second set of metadata.

14. The non-transitory machine-readable medium of claim 13, wherein time to live (TTL) fields of the first and second multicast data messages are different.

15. The non-transitory machine-readable medium of claim 12, wherein the metadata includes an identifier for the particular logical router of the first type and an identifier for the top-level logical router.

16. The non-transitory machine-readable medium of claim 11, wherein:

the forwarding element is a software switch executing on the host computer and the routing element is a software router executing on the host computer, the software router connected to a port of the software switch;

passing data messages between the software router and the software switch uses host computer resources; and use of the metadata reduces a number of copies of multicast data messages made by the software router in order to reduce number of copies of multicast data messages passed between the software router and the software switch.

17. The non-transitory machine-readable medium of claim 11, wherein the forwarding element further comprises a sets of instructions for, prior to receiving the multicast data message from the routing element:

receiving the multicast data message from one of (i) a data compute node connected to the forwarding element and (ii) a tunnel endpoint of the host computer;

based on the destination address of the multicast data message, identifying the set of recipient ports for the multicast group; and delivering copies of the multicast data message to recipient ports connected to the particular logical switch.

18. The non-transitory machine-readable medium of claim 17, wherein the forwarding element further comprises a set of instructions for, prior to receiving the multicast data message from the routing element, sending the multicast data message to the routing element, wherein a port between the forwarding element and the routing element belongs to the identified set of recipient ports.

19. The non-transitory machine-readable medium of claim 17, wherein the set of instructions for delivering copies of the multicast data message to recipient ports connected to the particular logical switch comprises a set of instructions for comparing a logical switch identifier appended to the multicast data message to logical switch identifiers associated with each port in the set of recipient ports.

20. The non-transitory machine-readable medium of claim 17, wherein the forwarding element further comprises sets of instructions for encapsulating a copy of the multicast data message and sending the encapsulated copy to a different host computer based on the identification of the set of recipient ports prior to receiving the multicast data message from the routing element.

\* \* \* \* \*